United States Patent
Kreuter

(10) Patent No.: US 9,284,916 B2
(45) Date of Patent: Mar. 15, 2016

(54) METHOD FOR OPERATING A RECIPROCATING PISTON INTERNAL COMBUSTION ENGINE WITH INTERNAL EXHAUST GAS ENERGY RECUPERATION AND RECIPROCATING PISTON INTERNAL COMBUSTION ENGINE

(75) Inventor: Peter Kreuter, Aachen (DE)

(73) Assignee: META MOTOREN-UND ENERGIE-TECHNIK GMBH, Herzogenrath (DE)

( * ) Notice: Subject to any disclaimer, the term of this patent is extended or adjusted under 35 U.S.C. 154(b) by 231 days.

(21) Appl. No.: 14/240,025

(22) PCT Filed: Aug. 17, 2012

(86) PCT No.: PCT/EP2012/003511
§ 371 (c)(1),
(2), (4) Date: Feb. 20, 2014

(87) PCT Pub. No.: WO2013/026552
PCT Pub. Date: Feb. 28, 2013

(65) Prior Publication Data
US 2014/0182566 A1 Jul. 3, 2014

(30) Foreign Application Priority Data
Aug. 24, 2011 (DE) .......................... 10 2011 111 761

(51) Int. Cl.
*F01B 17/00* (2006.01)
*F02M 25/07* (2006.01)
(Continued)

(52) U.S. Cl.
CPC ................ *F02M 25/07* (2013.01); *F02B 41/04* (2013.01); *F02B 51/02* (2013.01); *F02G 1/057* (2013.01); *Y02T 10/126* (2013.01)

(58) Field of Classification Search
CPC ........ F01B 17/00; F01B 17/02; F01B 17/022; F02B 32/22; F02B 41/04; F02B 51/02; F02B 75/04; F02B 75/32; F02G 1/057; F02G 5/02

USPC .... 123/48 A, 48 AA, 48 C, 48 D, 48 R, 70 R, 123/71, 72, 78 A, 78 AA, 79 C, 254, 255, 123/258, 270, 543–547, 550, 552, 568.11; 60/39.6, 508–515, 602, 604, 620
See application file for complete search history.

(56) References Cited

U.S. PATENT DOCUMENTS

| 4,074,533 A | 2/1978 | Stockton |
| 4,280,468 A | 7/1981 | Millman |

(Continued)

FOREIGN PATENT DOCUMENTS

| DE | 888331 | 8/1953 |
| DE | 19581652 | 11/2006 |

OTHER PUBLICATIONS

English translation of International Search Report for parent application No. PCT/EP2012/003511.

(Continued)

*Primary Examiner* — John Kwon
*Assistant Examiner* — Johnny H Hoang
(74) *Attorney, Agent, or Firm* — J-Tek Law PLLC; Jeffrey Tekanic; Scott Wakeman

(57) ABSTRACT

In a method for operating a reciprocating-piston internal combustion engine having internal exhaust gas energy recuperation, a cylinder head recuperator is heated up during an exhaust cycle by hot exhaust gas flowing through the cylinder head recuperator prior to being exhausted from the cylinder via an exhaust valve. During an intake cycle, fresh charge flows into the power chamber of the cylinder by passing around a cylinder head recuperator. During the subsequent compression stroke, the cylinder head recuperator is moved out of a recess formed in the cylinder head such that some of the compressed charge can flow into the recess. Near the end of the compression stroke, the cylinder head recuperator is moved back into the recess so that compressed charge located in the recess is forced to flow through the hot cylinder head recuperator and thereby be heated up immediately before ignition of the compressed charge.

20 Claims, 4 Drawing Sheets

(51) Int. Cl.
*F02B 41/04* (2006.01)
*F02B 51/02* (2006.01)
*F02G 1/057* (2006.01)

(56) References Cited

U.S. PATENT DOCUMENTS

| | | | |
|---|---|---|---|
| 4,284,055 A | 8/1981 | Wakeman | |
| 4,413,475 A | 11/1983 | Moscrip | |
| 4,630,447 A | 12/1986 | Webber | |
| 4,790,284 A | 12/1988 | Ferrenberg et al. | |
| 4,928,658 A | 5/1990 | Ferrenberg et al. | |
| 5,465,702 A * | 11/1995 | Ferrenberg | F02B 75/02 |
| | | | 123/543 |
| 5,540,191 A * | 7/1996 | Clarke | F02B 47/02 |
| | | | 123/25 C |
| 6,314,925 B1 * | 11/2001 | Britton | F02B 41/06 |
| | | | 123/52.5 |
| 6,340,013 B1 * | 1/2002 | Britton | F02B 19/02 |
| | | | 123/255 |
| 6,546,909 B1 * | 4/2003 | Clarke | F02G 3/02 |
| | | | 123/254 |
| 2008/0251050 A1 * | 10/2008 | Jacobsen | F01L 9/04 |
| | | | 123/46 R |
| 2014/0000567 A1 * | 1/2014 | Cleeves | F02D 15/02 |
| | | | 123/48 R |

OTHER PUBLICATIONS

English translation of International Preliminary Report on Patentability for parent application No. PCT/EP2012/003511.

* cited by examiner

INTAKE

COMPRESSION

EXHAUSTING

METHOD FOR OPERATING A RECIPROCATING PISTON INTERNAL COMBUSTION ENGINE WITH INTERNAL EXHAUST GAS ENERGY RECUPERATION AND RECIPROCATING PISTON INTERNAL COMBUSTION ENGINE

CROSS-REFERENCE

This application is the U.S. National Stage of International Application No. PCT/EP2012/003511 filed on Aug. 17, 2012, which claims priority to German patent application no. 10 2011 111 761.3 filed Aug. 24, 2011.

TECHNICAL FIELD

The invention relates to a method for operating a reciprocating-piston internal combustion engine having internal exhaust gas energy recuperation. The invention further relates to a reciprocating-piston internal combustion engine having internal exhaust gas energy recuperation.

RELATED ART

A reciprocating-piston internal combustion engine having internal exhaust gas energy recuperation is known from U.S. Pat. No. 4,790,284, in which an overall plate-shaped recuperator is reciprocally movable in the cylinders of the internal combustion engine between the cylinder head and each of the respective pistons. The recuperator fills the entire cylindrical cross-section and is movable by a shaft that passes through the cylinder head in a sealed manner. Fluid located in the cylinder can move from the space above the recuperator into the space below the recuperator only by flowing through the recuperator. During an intake stroke, the recuperator abuts on the upper side of the piston and follows the piston movement from the TDC to the BDC. During a first part of the compression, the recuperator continues to move together with the piston from the BDC towards the TDC while in abutment on the upper side of the piston and clearly moves away from the piston into abutment on the cylinder head before the piston reaches its TDC. As a result, the cylinder charge that flows through the recuperator is warmed by the recuperator. Then, fuel is injected into the warmed charge, which combusts by spontaneous ignition, so that the piston moves to its BDC, wherein the recuperator remains in abutment on the cylinder head. When the piston reaches its BDC and then moves towards the TDC to exhaust the charge, the recuperator moves towards the piston, so that the combusted charge flows through the recuperator and heats it. Then, the recuperator moves with the piston to its TDC, so that the charge located between the recuperator and the cylinder head is exhausted through the open exhaust valve.

SUMMARY

In one aspect of the present teachings, there are provided a method for operating an internal combustion engine having internal exhaust gas energy recuperation, as well as an internal combustion engine, which operate(s) with improved efficiency with a simple flow-through-ability and/or simple construction.

In another aspect of the present teachings, a cylinder head recuperator is provided that does not completely fill the cross-section of the cylinder, so that the intake valve can be opened when the recuperator is located at its top dead center and the fresh charge flows into the cylinder adjacent to the cylinder head recuperator. During the compression stroke, the cylinder head recuperator moves from its top dead center into a bottom dead center in a stroke, which is smaller than the stroke of the piston, and moves back into its top dead center at the end of the compression stroke. During the exhaust stroke with the exhaust valve open, the cylinder head recuperator moves away from its top dead center, and moves back to its top dead center upon closing of the exhaust valve. In spite of the smaller stroke of the cylinder head recuperator as compared to the piston stroke, a higher efficiency is achieved in terms of the utilization of the thermal energy contained in the exhaust gas.

The invention will be explained in an exemplary manner in the following with the assistance of schematic drawings and with further details.

BRIEF DESCRIPTION OF THE DRAWINGS

FIG. 1 shows the Intake phase (flow-in phase).
FIG. 2 shows the Compression phase.
FIG. 3 shows the Ignition of the charge.
FIG. 4 shows the Expansion (Power) phase.
FIG. 5 shows the Exhaust phase.

DETAILED DESCRIPTION OF THE INVENTION

Figure 1:
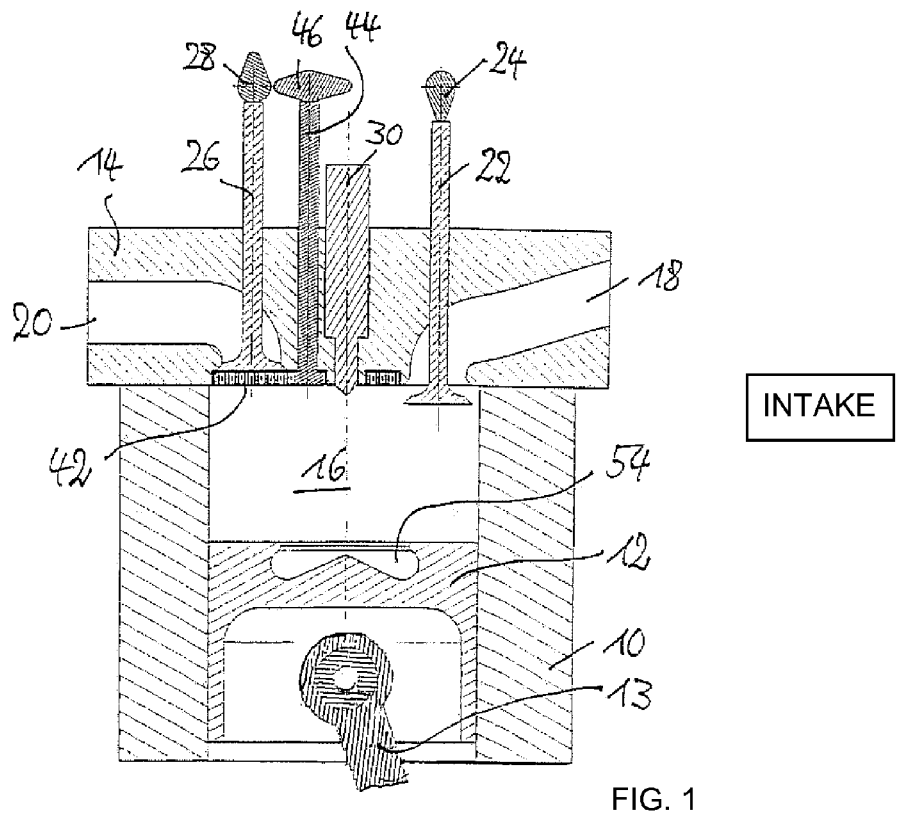
FIGS. 1 to 5 show cross-sectional views of a cylinder of a reciprocating-piston internal combustion engine corresponding to the phases of a 4-stroke-cycle that follow one another.
Figure 2:
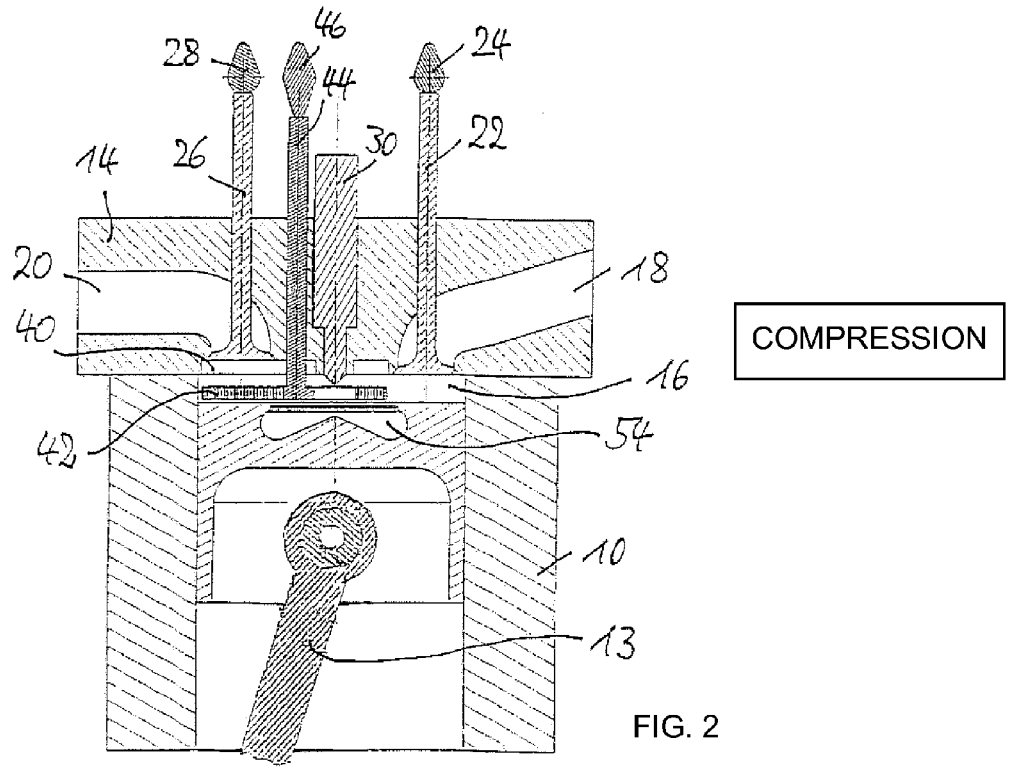

In FIGS. 1 to 5, only FIGS. 1 and 2 are fully provided with reference numbers. In the following FIGS. 3 to 5, only those components are provided with reference numbers, to which particular reference is made, for the sake of clarity.

According to FIGS. 1 and 2, a reciprocating-piston internal combustion engine contains at least one cylinder 10, in which a piston 12 is movable upwards and downwards. The piston 12 is connected via a piston rod 13 in a known manner with a crank assembly, in which the linear reciprocating movement of the piston is converted into a rotational movement of a crankshaft.

The cylinder 10 is closed from above by a front wall 14, which is formed by a cylinder head and in which an intake channel 18 leading into the power chamber 16 of the cylinder 10 and an exhaust channel 20 leading out of the power chamber 16 are formed.

In the intake opening, in which the intake channel 18 opens into the power chamber 16, an intake valve 22 operates that is actuated by an intake cam 24. In the exhaust opening, in which the exhaust channel 20 emanates from the power chamber 16, an exhaust valve 26 operates that is actuated by an exhaust cam 28.

In the construction of an internal combustion engine having direct fuel injection, an injector nozzle 30 is disposed in the front wall 14, by which fuel is injected into the power chamber 16.

The above-described arrangement is known and will therefore not be described in further detail.

The side of the front wall 14 bordering the power chamber 16 is formed with a hollow and/or a recess 40, in which the front side of the front wall bordering the power chamber 16 is spaced somewhat farther from the piston 12 than the area of the front wall formed with the intake opening. An overall plate-shaped cylinder head recuperator 42 is storable in the recess 40, such that the cylinder head recuperator 42 at least substantially fills the recess 40, is at least substantially in abutment on the closed exhaust valve 26 and extends at least substantially flush with the area of the inner side of the front wall 14, in which the intake opening is disposed. The closed intake valve 22, the area of the front wall 14 surrounding the intake opening and the side of the cylinder head recuperator 42 facing towards the power chamber 16 thus advantageously form a planar boundary surface of the power chamber 16 when the cylinder head recuperator is located in its uppermost position (TDCR).

The cylinder head recuperator 42 is comprised of a material capable of withstanding high temperatures and has passages (FIG. 6) formed as small bores that extend parallel to the axis of the cylinder.

The cylinder head recuperator 42 is rigidly connected with a shaft 44, which is guided in a sealed manner through the front wall 14 and/or through the cylinder head and is actuated by a recuperator cam 46, which has two cam lobs lying substantially opposite of each other. The cams 24, 28 and 46 can be formed in a known manner on a common cam shaft that is driven by the not-illustrated crankshaft of the internal combustion engine.

The cylinder head recuperator 42 has a hole such that the injection nozzle 30 projects through the cylinder head recuperator into the power chamber 16.

The piston 12 includes a combustion bowl 54 that is overall w-shaped in cross-section.

Figure 3:
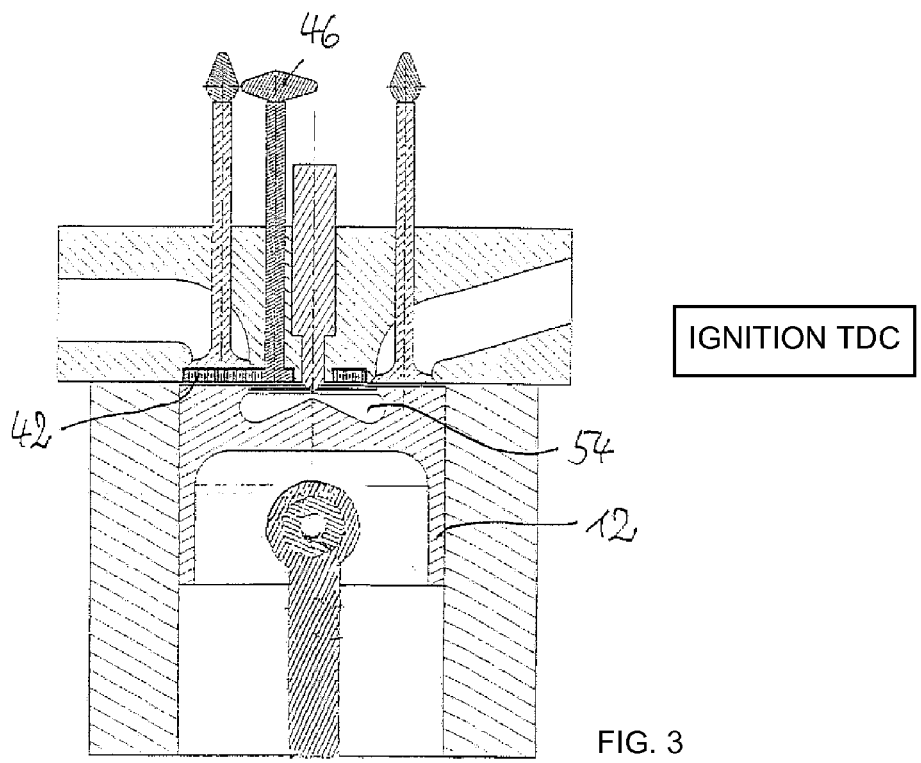
Figure 6:
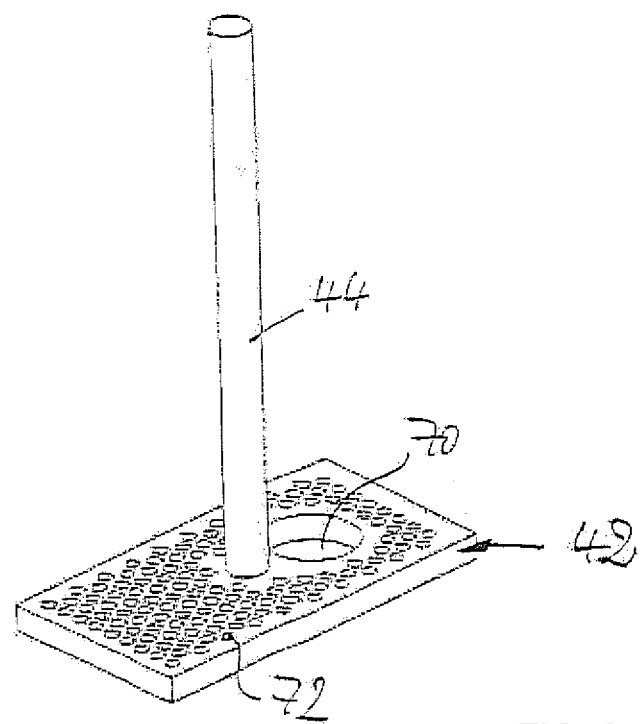
FIG. 6 shows a schematic, perspective view of a cylinder head recuperator.

FIG. 6 shows a schematic, perspective view of an example of a cylinder head recuperator 42. The cylinder head recuperator 42 is formed by a plate made of a material capable of withstanding high temperatures, e.g. metal or ceramic, and contains a hole 70, through which the injection nozzle 30 (FIG. 1) injects fuel into the combustion bowl 54 (FIG. 3). The plate-shaped cylinder head recuperator 42 is formed with a plurality of passages 72, e.g., bores, so that it is permeable by gas transverse to the extension direction of the plate, and it absorbs thermal energy contained in the gas and/or gives off thermal energy stored therein to the gas. Thus, the cylinder head recuperator 42 is a gas-permeable heat sink. The cylinder head recuperator (heat sink) 42 is rigidly connected with the shaft 44 or is formed as one-piece with the shaft 44, which is actuated by the recuperator cam 46. The shape of the cylinder head recuperator 42, which is rectangular in the illustrated example, can be varied. Advantageously, the cylinder head recuperator 42 is formed such that its outer perimeter corresponds to the inner perimeter of the recess 40 (FIG. 2), and such that it completely covers the exhaust valve(s) 26, the intake valve(s) 22 is (are) uncovered and the combustion bowl 54 (FIG. 2) is at least substantially covered.

The function of the described arrangement is as follows:

According to FIG. 1, the cylinder head recuperator 42 is located completely within the recess 40 of the front wall 14 during the intake (aspirated engines) or charging (supercharged engines) when the intake valve 22 is open and the exhaust valve 26 is closed, advantageously with its top side in abutment on the underside of the front wall 14 and the exhaust valve 26. The fresh charge or fresh air thus flows into the power chamber 16 by completely bypassing the cylinder head recuperator 42 and/or adjacent to the cylinder head recuperator 42, so that the fresh charge or the filling is scarcely affected by the cylinder head recuperator 42.

The position of the cylinder head recuperator according to FIG. 1 is its farthest elevated position and will be denoted in the following as TDCR (top dead center—recuperator).

After the intake stroke has ended and with the exhaust valve 22 closed, when the piston 12 moves from its BDC toward the TDC to compress the intaken charge, the cylinder head recuperator 42 is moved by a lob of the recuperator cam 46 from its TDCR into a bottom dead center (BDCR). The stroke of the cylinder head recuperator 42 is advantageously somewhat larger than the depth of the recess 40, so that the cylinder head recuperator 42 moves out of the recess 40 and fresh charge goes into the recess 40 by passing around the cylinder head recuperator 42. As is apparent, the stroke of the cylinder head recuperator 42 between TDCR and BDCR is considerably smaller than the stroke of the piston between its TDC and BDC.

When the piston 12 moves into its TDC, the cylinder head recuperator 42 is moved back into the recess 40. As a result, the piston 12 advantageously abuts at least substantially on the cylinder head recuperator 42, so that compressed fresh charge is pressed out of the recess 40 through the cylinder head recuperator 42 into the combustion bowl 54.

Figure 4:
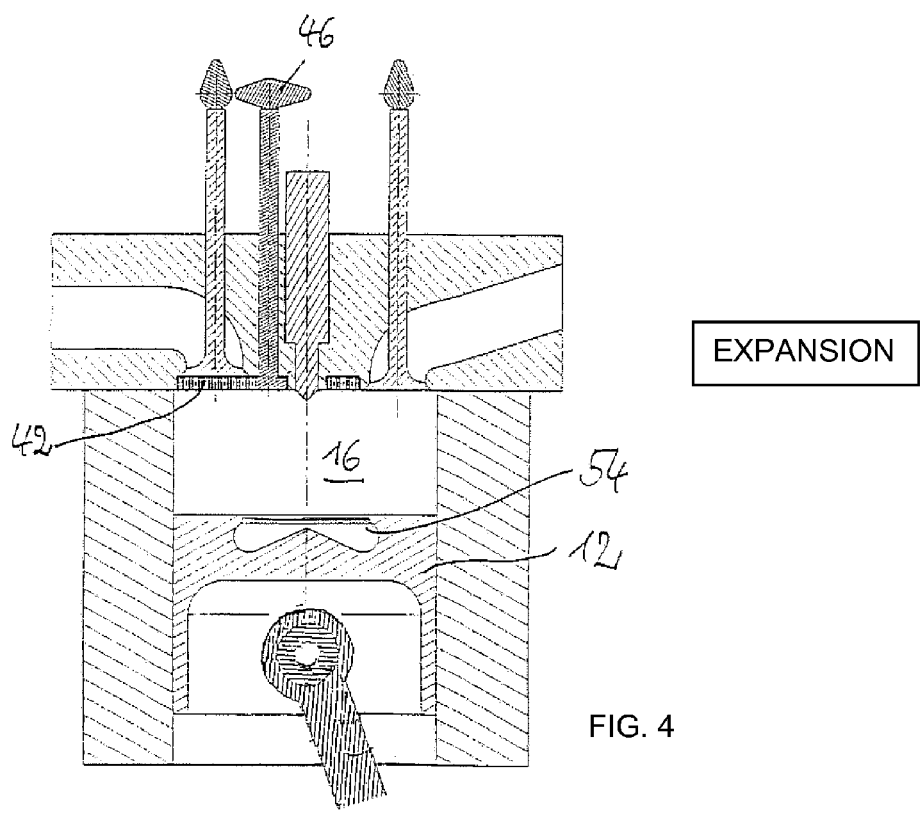
Figure 5:
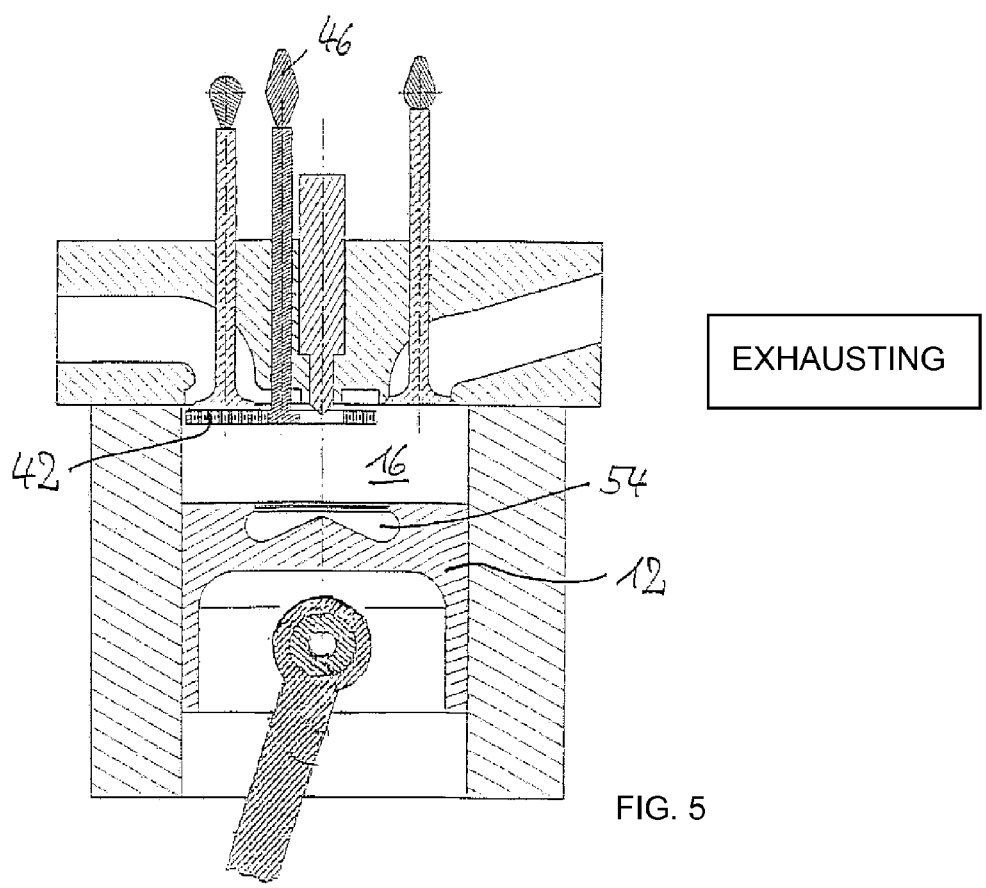

At the TDC of the piston, the position according to FIG. 3 is reached, in which the combustion bowl 54 is at least substantially closed by the cylinder head recuperator 42 located in its TDCR. Shortly before reaching this position or while in this position, fuel, e.g., diesel fuel, is injected from the injection nozzle 30 into the combustion bowl 54 and ignites itself, so that a power- or expansion-cycle begins, during which the cylinder head recuperator 42 remains in its TDCR (FIG. 4).

Prior to the exhaust valve 26 opening in the subsequent exhaust cycle and the movement of the piston 12 from its BDC into the TDC, the cylinder head recuperator 42 first moves out of its TDCR before the beginning of the opening movement of the exhaust valve and then completely moves out of the recess 40 at least before the end of the exhaust cycle. The movement stroke of the cylinder head recuperator 42 is advantageously somewhat larger than the opening stroke of the exhaust valve 26. At the end of the exhaust stroke, when the piston 12 reaches its TDC, the cylinder head recuperator moves 42 back into its TDCR in accordance with the closed exhaust valve 26.

During the illustrated movement sequences, the following heat transfers take place:

After the piston 12 has moved through its BDC, at the beginning of the exhaust up to about 60° after BDC, the cylinder head recuperator 42 is not completely moved out of the recess 40, so that the axis-parallel outer edge of the cylinder head recuperator 42 forms, with the axis-parallel inner perimeter wall of the recess 40, a ring-shaped gap having a small opening cross section, so that the initially very hot combustion gases flow through the cylinder head recuperator 42 and through the open exhaust valve into the exhaust channel 20. With further movement of the piston 12 toward the TDC, the cylinder head recuperator 42 is completely moved out of the recess 40 by the recuperator cam 46, so that the now-cooler, combusted gas goes into the exhaust channel 20 by passing around the cylinder head recuperator 42. In this way, the cylinder head recuperator 42 is intensively heated by the exhaust gas during the exhaust stroke. Depending upon the operational conditions of the internal combustion engine, e.g., charged or not charged, the cylinder head recuperator 42 can be moved completely out of the recess already at the BDC of the piston or for example at 120° after BDC.

When the cylinder head recuperator 42, which was moved completely out of the recess 40, is moved back into the recess 40 near the end of the compression stroke (FIG. 2), the fresh charge located in the recess 40, which fresh charge moved into the recess 40 by passing around the cylinder head recuperator 42, flows through the hot cylinder head recuperator and as a result, absorbs the exhaust gas energy stored in the hot cylinder head recuperator 42. In this way, the compressed fresh charge located in the combustion bowl 54 is intensively heated immediately before the ignition, whereby the efficiency of the internal combustion engine is considerably improved, because the compression end temperature is raised by the heat reclamation immediately before the combustion.

The cylinder head recuperator 42 advantageously can be moved completely out of the recess 40, so that the inner perimeter wall of the recess 40 and the outer perimeter of the cylinder head recuperator 42 can be formed in a complementary axis-parallel manner, and gas flow must take place substantially through the cylinder head recuperator 42 as soon as it is at least partially located in the recess 40.

As is apparent from the preceding discussion, the movement of the cylinder head recuperator 42 relative to the recess 40 during the compression stroke can be different from the movement during the exhaust stroke, so that the two cam lobs of the cylinder head recuperator 42 can be different.

With reference to FIG. 2, it is noted that the arrangement of the cylinder head recuperator 42 relative to the combustion bowl 54 can advantageously be designed such that, at the end of the compression stroke, compressed charge located underneath the intake valve 22 can flow into the combustion bowl 54 through a gap between the cylinder head recuperator 42 and the piston 12. Overall, it is advantageous when the combustion bowl 54 is closed as completely as possible by the cylinder head recuperator 42 in the TDC of the piston 12 (FIG. 3).

The exemplarily-described arrangement can be modified in various ways. For example, the wall of the combustion bowl 54 can be thermally isolated relative to the piston 12.

If the internal combustion engine is constructed as an Otto-engine, a spark plug can additionally be provided. Further, the mixture formation can take place externally, so that the injection nozzle 30 can be replaced by a spark plug.

REFERENCE NUMERAL LIST

10 Cylinder
12 Piston
13 Piston rod
14 Front wall
16 Power cylinder
18 Intake channel
20 Exhaust channel
22 Intake valve
24 Intake cam
26 Exhaust valve
28 Exhaust cam
30 Injection nozzle
40 Recess
42 Cylinder head recuperator
44 Shaft
46 Recuperator cam
70 Hole

The invention claimed is:

1. A method for operating a reciprocating-piston internal combustion engine having internal exhaust gas energy recuperation, the engine comprising a cylinder having a power chamber delimited by a piston, which is reciprocally movable in an axial direction of the cylinder, and by a front wall provided with at least one intake valve and at least one exhaust valve, in which power chamber a cylinder head recuperator is reciprocally movable in the axial direction of the cylinder and covers only a portion of the cross-section of the power chamber that is not covered by the at least one intake valve, the method comprising:

flowing-in fresh charge by moving the piston from its top dead center (TDC) to its bottom dead center (BDC) with the at least one intake valve open and the at least one exhaust valve closed, wherein the cylinder head recuperator is located in a top dead center (TDCR) during the flowing-in, so that the fresh charge flows into the power chamber by passing around the cylinder head recuperator, compressing the fresh charge by moving the piston from the BDC to the TDC with the at least one intake valve closed and the at least one exhaust valve closed, wherein the cylinder head recuperator is moved during the compression from its TDCR to its bottom dead center (BDCR) with a stroke between the TDCR and the BDCR that is smaller than the stroke of the piston between the TDC and BDC, and wherein the cylinder head recuperator is moved back into its TDCR at the end of the compression, combusting the compressed fresh charge with the at least one intake valve closed and the at least one exhaust valve closed and thereby causing the piston to move from the TDC to the BDC, wherein the cylinder head recuperator remains in the TDCR during the combustion, and exhausting the combusted charge with the at least one exhaust valve open and the at least one intake valve closed by moving the piston from the BDC to the TDC, wherein the cylinder head recuperator is moved away from its TDCR with opening of the at least one exhaust valve and, when closing the at least one exhaust valve at the end of the exhausting, the cylinder head recuperator is moved back into the TDCR with closing of the at least one exhaust valve.

2. The method according to claim 1, wherein when the cylinder head recuperator is disposed in its TDCR position, it at least substantially abuts on the front wall and on the closed at least one exhaust valve, and is stored in a recess of the front wall of the cylinder, the recess having a depth that is smaller than the stroke of the cylinder head recuperator between the TDCR and the BDCR.

3. The method according to claim 2, wherein a space between the cylinder head recuperator and the recess is connected with the power chamber by a gas-flow path that forms around the cylinder head recuperator when the cylinder head recuperator has moved out of the recess.

4. The method according to claim 2, wherein the cylinder head recuperator is completely moved out of the recess at least before the end of the exhausting of the combusted charge.

5. The method according to claim 2, wherein the cylinder head recuperator is moved back into the recess at the end of the compression stroke such that compressed charge, which is located in a space between the recess and the cylinder head recuperator first flows through the cylinder head recuperator into a combustion chamber, which is located between the piston and the cylinder head recuperator, immediately before ignition of the compressed charge.

6. The method according to claim 3, wherein the cylinder head recuperator is completely moved out of the recess at least before the end of the exhausting of the combusted charge.

7. The method according to claim 6, wherein the cylinder head recuperator is moved back into the recess at the end of the compression stroke such that compressed charge, which is located in a space between the recess and the cylinder head recuperator first flows through the cylinder head recuperator into a combustion chamber, which is located between the piston and the cylinder head recuperator, immediately before ignition of the compressed charge.

8. A reciprocating-piston internal combustion engine having internal exhaust gas energy recuperation, comprising:

a cylinder having a power chamber delimited by a reciprocally-moving piston and by a front wall, at least one intake valve and at least one exhaust valve disposed in the front wall, a cylinder head recuperator that is reciprocally movable in an axial direction between the piston and the front wall, the cylinder head recuperator covering only a portion of the cross-section of the power chamber perpendicular to the axial direction that is not covered by the intake valve, and being permeable by a fluid in the axial direction, and an actuating device configured to coordinate respective movements of the piston, the intake and exhaust valves and the cylinder head recuperator with respect to one another such that:

fresh charge flows into the power chamber by moving the piston from its top dead center (TDC) to its bottom dead center (BDC) with the at least one intake valve open and the at least one exhaust valve closed, wherein the cylinder head recuperator remains in a top dead center (TDCR) during the flowing in of the fresh charge, so that the fresh charge flows into the power chamber by passing around the cylinder head recuperator, the fresh charge is compressed by moving the piston from the BDC to the TDC with the at least one intake valve closed and the at least one exhaust valve closed, wherein the cylinder head recuperator is moved during the compression from its TDCR into a bottom dead center (BDCR) with a stroke between the TDCR and the BDCR that is smaller than the stroke of the piston between the TDC and BDC, and the cylinder head recuperator is moved back into its TDCR at the end of the compression, the compressed fresh charge is combusted with the at least one intake valve closed and the at least one exhaust valve closed thereby causing the piston to move from the TDC into the BDC, wherein the cylinder head recuperator remains in the TDCR during the combustion, and the combusted charge is exhausted with the at least one exhaust valve open and the at least one intake valve closed by movement of the piston from the BDC to the TDC, wherein the cylinder head recuperator is moved away from its TDCR with opening of the at least one exhaust valve and, when closing the at least one exhaust valve at end of the exhausting, the cylinder head recuperator is moved back into the TDCR with closing of the at least one exhaust valve.

9. The reciprocating-piston internal combustion engine according to claim 8, wherein an area of the front wall of the cylinder, in which the at least one exhaust valve is disposed, is offset in a direction away from the piston such that a recess is defined in the front wall, the cylinder head recuperator being storable in the recess when located in its TDCR.

10. The reciprocating-piston internal combustion engine according to claim 8, further comprising an injection nozzle disposed in the front wall, the injection nozzle being configured to inject fuel into the power chamber through a hole defined in the cylinder head recuperator.

11. The reciprocating-piston internal combustion engine according to claim 8, wherein the cylinder head recuperator is rigidly connected with at least one shaft, which is displaceably guided through the front wall in a sealed manner.

12. The reciprocating-piston internal combustion engine according to claim 11, further comprising a cam configured to actuate the shaft.

13. The reciprocating-piston internal combustion engine according to claim 12, wherein an area of the front wall of the cylinder, in which the at least one exhaust valve is disposed, is offset in a direction away from the piston such that a recess is defined in the front wall, the cylinder head recuperator being storable in the recess when located in its TDCR.

14. The reciprocating-piston internal combustion engine according to claim 13, further comprising an injection nozzle disposed in the front wall, the injection nozzle being configured to inject fuel into the power chamber through a hole defined in the cylinder head recuperator.

15. A method of operating an internal combustion engine, in which the internal combustion engine comprises:

at least one cylinder defining a combustion chamber that extends in an axial direction and has a cross-section perpendicular to the axial direction, a cylinder head, a piston reciprocally-movable within the cylinder, wherein the cylinder, the cylinder head and the piston define a combustion chamber and wherein the cylinder head includes at least one intake valve and at least one exhaust valve, each being in fluid communication with the combustion chamber, and an at least substantially plate-shaped heat sink reciprocally movable in the axial direction of the combustion chamber between the piston and the cylinder head, the heat sink covering only a portion of the cross-section of the combustion chamber that is not covered by the at least one intake valve, and being gas-permeable in the axial direction of the combustion chamber, and wherein the method comprises:

during an exhaust stroke, forcing hot combusted gases through the gas-permeable heat sink before exiting the combustion chamber via the at least one exhaust valve, wherein the heat sink absorbs thermal energy from the hot combusted gases and heats up, during a subsequent intake stroke, causing fresh charge to flow through the at least one intake valve into the combustion chamber without flowing through or being impeded by the heat sink, which is disposed directly adjacent to the cylinder head throughout the intake stroke, and during a subsequent compression stroke, first moving the heat sink away from the cylinder head so that a portion of the fresh charge flows into a space that forms between the heat sink and the cylinder head and then near an end of the compression stroke, moving the heat sink back towards the cylinder head, thereby forcing the portion of the fresh charge located in the space between the heat sink and the cylinder heat to flow through the gas-permeable heat sink, wherein the fresh charge is heated up immediately before ignition in a subsequent expansion stroke.

16. The method according to claim 15, wherein:

a recess is defined in the cylinder head, the recess having a perimeter that has a complementary shape to an outer perimeter of the heat sink, the at least one exhaust valve is disposed in the recess, the at least one intake valve is disposed outside of the recess, the heat sink is stored in the recess throughout the intake stroke, and the heat sink is moved out of the recess during an initial portion of the compression stroke, such that the space that forms between the heat sink and the cylinder head includes a hollow space defined by the recess.

17. The method according to claim 16, wherein the heat sink is moved completely out of the recess during an intermediate portion of the exhaust stroke and is subsequently moved back completely within the recess by an end of the exhaust stroke.

18. The method according to claim 17, wherein when the heat sink is disposed within the recess, the heat sink abuts on the at least one exhaust valve and on a portion of the cylinder head.

19. An internal combustion engine comprising:
- at least one cylinder defining a combustion chamber that extends in an axial direction,
- a cylinder head,
- a piston reciprocally-movable within the cylinder, wherein the cylinder, the cylinder head and the piston define a combustion chamber and wherein the cylinder head includes at least one intake valve and at least one exhaust valve, each being in fluid communication with the combustion chamber,
- a recess defined in the cylinder head and having a perimeter, the at least one exhaust valve being disposed within the perimeter of the recess and the at least one intake valve being disposed outside of the perimeter of the recess,
- an at least substantially plate-shaped heat sink reciprocally movable in the axial direction of the combustion chamber between the piston and the cylinder head, the heat sink being gas-permeable in the axial direction of the combustion chamber, being capable of absorbing thermal heat from hot exhaust gas flowing therethrough during an exhaust stroke, and having an outer perimeter that is complementary to, and fits entirely within, the perimeter of the recess, and
- an actuator configured to: (i) hold the heat sink within the recess throughout an intake stroke so that the heat sink does not impede a flow of fresh air or an air-fuel mixture into the combustion chamber, (ii) move the heat sink completely out of the recess during a portion of a compression stroke so that the fresh air or air-fuel mixture flows into a hollow space defined by the recess and (iii) then subsequently move the heat sink back into the recess prior to conclusion of the compression stroke so that the fresh air or air-fuel mixture disposed in the hollow space is forced to pass through the gas-permeable heat sink and heat up.

20. The internal combustion engine according to claim 19, wherein the actuator is further configured to move the heat sink completely out of the recess during an intermediate portion of the exhaust stroke and then subsequently move the heat sink back completely within the recess by an end of the exhaust stroke.

* * * * *